Feb. 22, 1944.  D. A. HOLT  2,342,104
MANUFACTURE OF LIGHT ARMOR PLATE
Filed Feb. 5, 1942
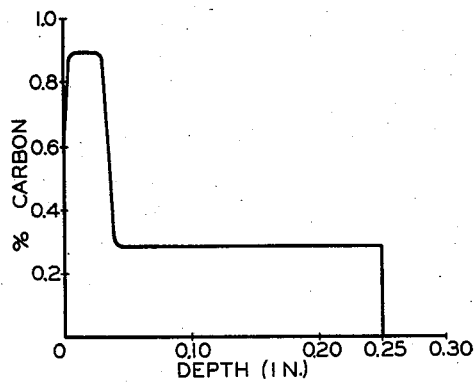
FIG. 1
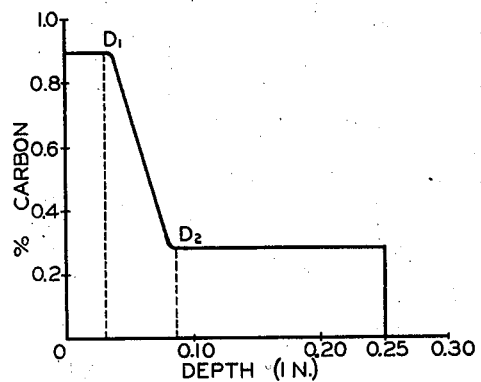
FIG. 2
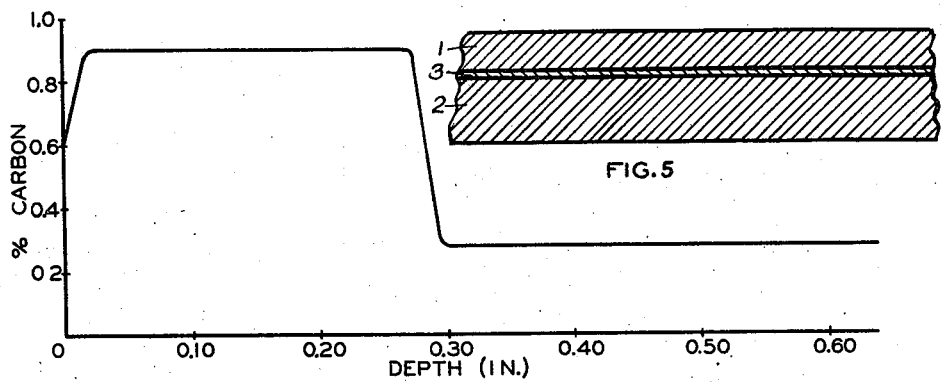
FIG. 3
FIG. 5
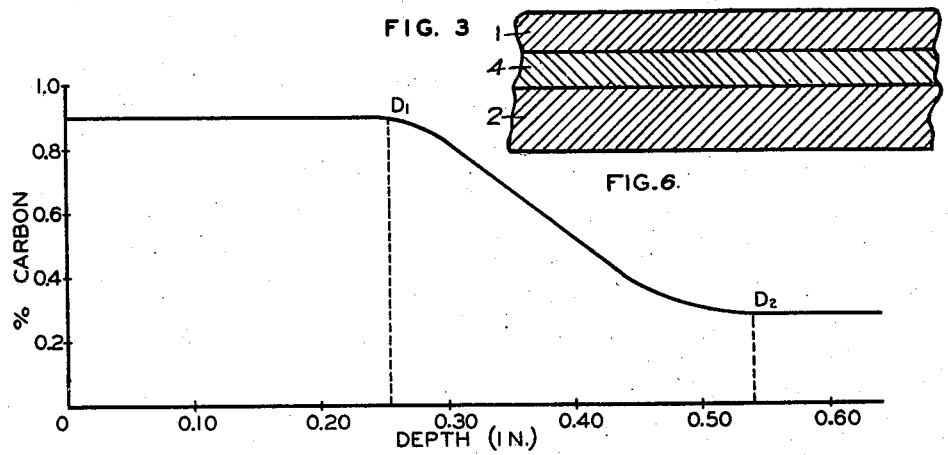
FIG. 4
FIG. 6
*INVENTOR.*
DONALD A. HOLT
BY *Theodore P. Budraw*
*ATTORNEY.*

Patented Feb. 22, 1944

2,342,104

UNITED STATES PATENT OFFICE 2,342,104

MANUFACTURE OF LIGHT ARMOR PLATE

Donald A. Holt, Niagara Falls, N. Y., assignor to E. I. du Pont de Nemours & Company, Wilmington, Del., a corporation of Delaware Application February 5, 1942, Serial No. 429,608

5 Claims. (Cl. 148—19)

This invention relates to the manufacture of armor plate and more particularly to the manufacture of light armor plate comprising composite structures of low-carbon and high-carbon steels.

The thickness of armor plate varies ordinarily from one-eighth inch up to the extremely thick plates used for arming battle ships. My herein described invention relates to the manufacture of light face hardened armor plate, and I use that term in this specification and in the appended claims to mean armor plate not more than about two inches thick.

In light face hardened armor plate it is essential that the outer surface of the armor have a high degree of hardness while the inside or base should be tough and strong. This may be obtained by case hardening steel plate so that a high concentration of carbon is produced in the outer surface of the plate, which produces a hard surface on heat treatment. In order to produce the required hardness and resistance to projectiles, the case must be of high carbon content and of extraordinary depth. Utilizing conventional case hardening procedures, this requires unusually long time of carburizing treatment, e. g. on the order of 10 to 100 hours, or even longer, depending on the thickness of the plate.

This type of armor plate also may be made by making a so-called ply metal by joining a plate of high-carbon steel to a base plate of low-carbon steel, for example by welding or by the so-called "Pluramelt" process. This produces a composite or ply steel plate which may be heat treated so as to give extreme hardness to the exterior portion having the higher carbon content.

In heat treating ply steel sheets of the type described above, considerable difficulty is often experienced because the ply metal tends to behave like a bi-metallic structure. This results in warping and distortion as a result of the heating and cooling operations. The heat treating operations also often may result in more or less decarburization at the surface of the plate.

An object of the present invention is to provide an improved method for making a composite or ply steel light armor plate. A further object is to provide a method for preventing distortion or warping from the heat treatment of such ply steel armor plate. Another object is to produce a superior armor plate having improved resistance to projectiles and at the same time, a high degree of surface hardness. My invention also includes the improved ply armor plate herein described. Other objects will be apparent from the following description.

The appended drawing is a diagrammatic illustration of my invention. Figures 1, 2, 3, and 4 are graphs showing the per cent of carbon in steel armor plate at different depths, i. e. at different distances from the outside surface. The depths expressed in decimal fractions of an inch are plotted as abscissae, while the carbon concentrations are plotted as ordinates. Figures 5 and 6 are cross sections of composite steel armor plate of the type herein referred to.

I have discovered that the tendency for ply steel armor plates to warp and distort during heat treatment may be overcome and the strength and resistance to penetration by projectiles may be greatly improved by subjecting the outside surface of the armor plate to a carburizing treatment while heating the plate to a temperature of 1600 to 1900° F., preferably at around 1750° F. The carburizing treatment selected is one which is adapted to carburize the steel to produce a carbon case containing substantially the same or a greater percentage of carbon as that already existing in the exterior ply of the composite plate. The treatment is carried out for a sufficient length of time to carry a substantial degree of carbon from the exterior ply into the base or low-carbon ply.

The invention may be more readily understood by reference to the drawing. Figure 1 is a graph showing the percentage of carbon in different depths of a ply-metal or composite plate made by welding a high-carbon steel outer ply to a low-carbon steel base ply. In this example, the high-carbon layer of the composite plate is about 0.034 inch thick, while the thickness of the entire composite plate is 0.25 inch. Figure 5 is a diagrammatic cross section of such a plate, consisting of the high-carbon outer ply 1 and the low-carbon base ply 2, these being joined together by weld 3. The graph of Figure 1 shows that the carbon content of the outer ply 1 is 0.9% substantially throughout except on the surface, while the carbon content of the base ply 2 is substantially 0.24% throughout. It will be noted that the outer surface of the composite plate is relatively low in carbon content, this being caused by decarburization resulting from hot working in making the composite plate.

Figures 2 and 6 show the application of my invention applied to the plate illustrated by Figures 1 and 5. Figure 2 shows the carbon concentrations in the plate after it has been subjected to a suitable carburizing treatment, as hereinafter described.

This carburizing treatment has resulted in the disappearance of the decarburized zone shown in Figure 1 at the surface of the plate and has also caused a relatively broad diffusion of carbon from the outside ply into the base ply. Referring to Figure 6, this zone of carbon diffusion is diagrammatically represented by layer 4. Referring back to Figure 2, the graph shows the extent of the zone of carbon diffusion lying between the points $D_1$ and $D_2$, $D_1$ being the point where the carbon content begins to become smaller than that of the outer ply and $D_2$, the point where the carbon content begins to equal that of the base ply of the plate. It is also noted that the diffusion of carbon into the base ply has taken place without apparent loss of carbon from the outer ply, the thickness of the outer ply being substantially unchanged. This is because the outer ply has absorbed carbon during the carburizing treatment.

Figures 3 and 4 are graphs similar to Figures 1 and 2 and represent a two-ply armor plate 2 inches thick. Figure 4, showing a relatively wide carbon diffusion zone (between points $D_1$ and $D_2$), illustrates the armor plate of Figure 3 after subjection to the carburizing treatment for a period of approximately 50 hours.

I have discovered that in order to prevent distortion and working of the plate during heat treatment and, at the same time, to secure the desired ballistic properties, it is essential that there be a definite, limited relationship between (1) the relative carbon contents of the outer ply and the base ply of the composite plate, (2) the width of the above described carbon diffusion zone and (3) the total thickness of the composite armor plate. This relationship may be expressed mathematically, thus:

$$\frac{D_2-D_1}{C_2-C_1}=PK$$

where $D_1$ and $D_2$ are the depths in inches at the beginning and end, respectively, of the diffusion zone, expressed in inches; $C_1$ and $C_2$ are the carbon contents of the base and outer plies, respectively, of the sheet, expressed in per cent by weight; P is the total plate thickness, expressed in inches; and K is a mathematical constant or numerical factor, which, in accordance with my invention, lies within the range of 0.18 to 0.52, and preferably is about 0.20.

For example, for a ¼ inch armor plate, the ratio between the diffusion zone ($D_2-D_1$) and the difference between the respective carbon contents of the outer and base plies ($C_2-C_1$) should be equal to:

$$PK=\tfrac{1}{4}K$$

or $$\frac{D_2-D_1}{C_2-C_1}=\frac{K}{4}=\frac{0.045}{1} \text{ to } \frac{0.13}{1}, \text{ preferably about } \frac{0.05}{1}$$

Similarly, for a 2 inch armor plate, this ratio will be:

$$\frac{D_2-D_1}{C_2-C_1}=2K=\frac{0.36}{1} \text{ to } \frac{1.04}{1}, \text{ preferably about } \frac{0.4}{1}$$

*Example I*

Sheets of low-carbon and high-carbon steel are welded together to form a two-ply composite plate ¼ inch thick. The composite plate then is held for about 3 hours in a fused salt cyanide case hardening bath containing around 50% by weight of barium chloride, 5 to 10% by weight each of strontium and potassium chlorides and a sodium cyanide concentration maintained at 8 to 12% by weight. The bath temperature is maintained at about 1750° F.

Carbon gradient analyses of this two-ply plate, before and after treatment in the cyanide bath, give data which on plotting give curves approximately as shown in Figures 1 and 2 of the appended drawing. These data show:

Carbon content of base ply ($C_1$)_per cent__ 0.24
Carbon content of outer ply ($C_2$)___do____ 0.88
Depth of outer ply (depth of 0.88% carbon steel, or $D_1$) _____inch__ 0.034
Depth to base ply (to 0.24% carbon steel, or $D_2$)_____inch__ 0.084
With the diffusion zone ($D_2-D_1$)___do____ 0.050

$$\text{Ratio} \quad \frac{D_2-D_1}{C_2-C_1}=\frac{0.050}{0.64}=\frac{0.078}{1}$$

*Example II*

A two-ply plate, 2 inches thick is formed and treated in a base hardening bath according to the method of Example 1, except that the treatment in the case hardening bath at 1750° F. is continued for 48 hours. Carbon gradient analyses give the curves shown in Figures 3 and 4 of the appended drawing, according to the following data:

Carbon content of base ply ($C_1$)__per cent__ 0.28
Carbon content of outer ply ($C_2$)____do____ 0.88
Depth of outer ply (depth of 0.88% carbon steel, or $D_1$) _____inch__ 0.26
Depth to base ply (to 0.28% carbon steel, or $D_2$) _____inch__ 0.53
Width of diffusion zone ($D_2-D_1$)____do____ 0.27

$$\text{Ratio} \quad \frac{D_2-D_1}{C_2-C_1}=\frac{0.27}{0.62}=\frac{0.435}{1}$$

Similar results may be obtained by using the various known fused salt carburizing baths to treat the ply armor plate. For example, there are a number of suitable case hardening baths characterized by containing one or more of the alkaline earth metal chlorides, and up to about 20% by weight (e. g., 5 to 20%) of alkali metal cyanide or other cyanogen compounds, usually also containing some alkali metal chloride, carbonate, or both. An example of this type of carburizing bath which is suitable for practicing my invention is one having the following approximate composition:

| | Per cent |
|---|---|
| Sodium cyanide | 8–12 |
| Barium chloride or carbonate | 40–60 |
| Strontium chloride or carbonate | 7– 9 |
| Potassium chloride or carbonate | 5– 7 |
| Sodium carbonate | Remainder |

While I prefer to use a carburizing bath having the above composition, the invention is not restricted thereto, as various other known types of carburizing salt baths, containing cyanide or other carburizing material, may be utilized with equivalent results. Also, other known methods may be utilized, for example pack carburizing or gas carburizing methods. In any case, it is essential that the carburizing medium used shall be capable of producing the desired high-carbon content in the exterior surface of the armor plate, preferably substantially the same carbon concentration as that in the main portion of the exterior layer of the composite plate, or higher.

I have found that in most cases these desired results are best obtained, and in a minimum time of treatment by using some type of fused salt carburizing bath.

In its broader aspects, my invention includes subjecting the ply steel plate to any cementation treatment at the above stated temperatures, it being understood that cementation means the introduction of a hardening element into the surface of the steel. For example, the invention may be practiced by a nitriding instead of a carburizing treatment, or by using a cementation method which causes both nitriding and carburizing. Thus, the exterior portion of the armor plate may be nitrided instead of, or in addition to, carburized. In that event, it is essential that sufficient nitrogen be introduced so as to maintain the desired hardness on the surface and in the outside ply of the treated plate. In other words, if the nitriding treatment results in appreciable decarburization in the exterior ply, it preferably should introduce sufficient nitrogen to produce hardness equivalent to that produced by the carbon which is lost. When both carburizing and nitriding are utilized, I prefer to first carburize and then nitride.

The time required in the carburizing bath or equivalent treatment to cause carbon diffusion between the plies of the armor plate as above described will vary depending upon factors such as on the nature of the steel, plate thickness, kind of carburizing or other cementation treatment, treating temperature, method of heating, and the like, as will be apparent to those skilled in heat treating metals. The time required may be determined experimentally in any given case. Generally, I prefer to hold the armor plate in the carburizing treatment at a temperature of around 1600 to 1900° F. for a period of time varying with the plate thickness approximately as shown by the following table:

| Plate thickness | Time at heat |
|---|---|
|  | Hours |
| 0.25 inch | 2 |
| 0.375 inch | 3.5 |
| 0.5 inch | 5 |
| 0.75 inch | 10 |
| 1.0 inch | 15 |
| 1.5 inches | 30 |
| 2.0 inches | 50 |

The times in the above table are the times during which the metal is "at heat" and do not include the time required to bring the plate up to the desired treating temperature.

In practicing this invention it is, of course, essential that the carburizing or other cementation medium come into contact only with the exterior surface of the armor plate; that is, base portion of the composite plate must be protected from carburization. To produce this result several known methods may be utilized. For example, two sheets of armor plate of equal size and shape may be fastened together by placing them back to back and welding a seal around the edges. After carburizing, the sheets may be separated by cutting them around the edge portion or by cutting the weld. Another method which is generally satisfactory consists in copper plating the underside of the composite armor plate.

In the production of ply armor plate in accordance with my invention, the relative thickness and carbon contents of the plies may be varied, depending on the kinds of steel utilized and the service for which the plate is intended. Generally, I prefer, in a two-ply plate, to have the thickness of the outer ply including the diffusion zone, equal to about 0.2 to 0.25 of the total plate thickness, a carbon content of about 0.75 to 1% by weight in the outer ply and a carbon content of about 0.1 to 0.4% by weight in the base ply. In most cases a carbon content of 0.22 to 0.28% by weight is preferred for the base play. The invention is not restricted to two-ply structures, although two plies ordinarily are satisfactory; and it is seldom necessary to utilize more than two plies to obtain excellent ballistic characteristics. However, if desired, light armor plate having more than two plies can be made according to my invention with good results. My invention is not restricted to the use of any particular grade or type of steel; the nickel molybdenum alloy steels most commonly utilized for light armor plate are well adapted for my purpose.

In common with other methods for making light armor plate, my herein described carburized ply plate should be heat treated after the carburization or other cementation treatment, to fully develop the desired physical properties. My invention is not restricted to any particular methods of heat treatment; the conventional methods may be applied to my ply plate with satisfactory results. Generally such heat treatment consists in reheating, quenching and drawing. The details of such heat treatments of course will depend on factors such as the composition of the steel utilized and the physical properties desired and are well known to those skilled in making steel armor plate.

My invention results in more rapid manufacture of armor plate having excellent physical properties, which has a high degree of resistance to penetration of projectiles and which has comparatively little tendency to warp or distort when subjected to heat treatment cycles consisting of heating, quenching and drawing. Heretofore, similar results could be approached only by case carburizing single sheets of the desired armor plate thickness, whereby it was necessary to carry out the carburizing treatment for exceedingly long periods of time, for example 10 to 100 hours or longer, in order to obtain a case having the required thickness. By means of my process, on the other hand, the composite or ply metal structure can be made relatively quickly and a carburization treatment of 2 to 50 hours, depending on plate thickness, is usually sufficient. In general, the carburization time in my process is about ¼ of the time required to obtain similar results by carburizing a single sheet. Furthermore, the relatively wide carbon diffusion zone between the outer and base plies results in increased strength in the armor plate, and superior ballistic properties. Another important advantage is that the resulting finished plate has the desired high degree of surface hardness.

I claim:

1. The process for manufacture of light armor plate which comprises forming a composite steel plate having an outer ply of high-carbon steel joined to a base ply of low-carbon steel and subjecting said composite plate to a carburizing treatment at a temperature of about 1600 to 1900° F. for a time sufficient to form at the juncture of said plies a carbon diffusion zone of such width that the ratio of said width, expressed in inches, to the difference between the respective carbon contents of said plies, expressed in per cent by weight, is equal to the product of the thickness of said plate, in inches, and a numerical factor lying in the range: 0.18 to 0.52, while protecting the surface of said base ply from contact with the carburizing agent.

2. The process for manufacture of light armor plate which comprises forming a composite steel plate having an outer ply of high-carbon steel containing about 0.75 to 1% by weight of carbon joined to a base ply of low-carbon steel containing about 0.1 to 0.4% by weight of carbon and subjecting said composite plate to a carburizing treatment at a temperature of about 1600 to 1900° F. for a time sufficient to form at the juncture of said plies a carbon diffusion zone of such width that the ratio of said width, expressed in inches to the difference between the respective carbon contents of said plies, expressed in per cent by weight is equal to the product of the thickness of said plate, in inches and a numerical factor lying in the range: 0.18 to 0.52, while protecting the surface of said base ply from contact with the carburizing agent.

3. The process according to claim 1 wherein the plate is treated in a fused salt carburizing bath containing at least one alkaline earth metal salt and up to 20% by weight of alkali metal cyanide.

4. The process according to claim 1 wherein the plate is treated in a fused salt carburizing bath containing at least 40% by weight of barium chloride and 8 to 12% by weight of sodium cyanide.

5. In the manufacture of light armor plate, the step comprising subjecting a composite steel plate having joined plies of high- and low-carbon steels to a carburization treatment at a temperature of about 1600 to 1900° F., so as to cause substantial carbon diffusion at the juncture of said plies.

DONALD A. HOLT.